United States Patent
Kumar et al.

(10) Patent No.: US 10,761,641 B2
(45) Date of Patent: Sep. 1, 2020

(54) DYNAMIC ON-DEMAND JOINT PROCESSING OF TOUCH SENSOR DATA FROM MULTIPLE INDEPENDENT TOUCH SENSORS AT AN ELECTRONIC CIRCUIT

(71) Applicant: Intel Corporation, Santa Clara, CA (US)

(72) Inventors: Arvind Kumar, Beaverton, OR (US); Antonio Cheng, Portland, OR (US); Chai Huat Gan, Bukit Mertajam (MY)

(73) Assignee: INTEL CORPORATION, Santa Clara, CA (US)

( * ) Notice: Subject to any disclaimer, the term of this patent is extended or adjusted under 35 U.S.C. 154(b) by 78 days.

(21) Appl. No.: 16/024,654

(22) Filed: Jun. 29, 2018

(65) Prior Publication Data

US 2019/0042049 A1 Feb. 7, 2019

(51) Int. Cl.
*G06F 3/041* (2006.01)
*G06F 13/42* (2006.01)

(52) U.S. Cl.
CPC ........ *G06F 3/0416* (2013.01); *G06F 13/4278* (2013.01); *G06F 2203/04101* (2013.01); *G06F 2203/04104* (2013.01)

(58) Field of Classification Search
CPC ......... G06F 3/012; G06F 3/013; G06F 3/0416
See application file for complete search history.

(56) References Cited

U.S. PATENT DOCUMENTS

| 2006/0047989 | A1* | 3/2006 | Delgado | G06F 1/12 713/375 |
| 2017/0090643 | A1* | 3/2017 | Kim | G06F 3/0412 |
| 2017/0153763 | A1* | 6/2017 | Vavra | G06F 3/0488 |
| 2017/0285710 | A1* | 10/2017 | Ardanaz | G06F 1/28 |
| 2019/0013748 | A1* | 1/2019 | Barrenscheen | H02P 6/10 |
| 2019/0042049 | A1* | 2/2019 | Kumar | G06F 3/0416 |

\* cited by examiner

*Primary Examiner* — Alexander Eisen
*Assistant Examiner* — Nathaniel P Brittingham
(74) *Attorney, Agent, or Firm* — Hanley, Flight & Zimmerman, LLC

(57) ABSTRACT

Technology for an electronic circuit is described. The electronic circuit can include one or more timed general-purpose input/output (GPIO) pins and a controller. The controller can receive touch sensor data pulses from a plurality of touch sensor integrated circuits (ICs) that are each communicatively coupled to the electronic circuit. A first touch sensor data pulse received from a first touch sensor IC in the plurality of touch sensor ICs can be time synchronized with a second touch sensor data pulse received from a second touch sensor IC in the plurality of touch sensor ICs using the one or more timed GPIO pins. The controller can combine the touch sensor data pulses received time synchronously from each of the plurality of touch sensor ICs to produce joint touch sensor data. The controller can perform joint processing of the joint touch sensor data.

24 Claims, 7 Drawing Sheets

DYNAMIC ON-DEMAND JOINT PROCESSING OF TOUCH SENSOR DATA FROM MULTIPLE INDEPENDENT TOUCH SENSORS AT AN ELECTRONIC CIRCUIT

BACKGROUND

Touch sensors and/or touch screens can capture and record physical touch or embrace on a device and/or object. Touch sensors and/or touch screens can capture touch/stylus data (e.g., based on movement of a finger or a stylus, respectively) and can send the touch/stylus data to a processing unit. Touch sensors and/or touch screens can be sensitive to touch, force and pressure. Touch sensors and/or touch screens can detect various kinds of touch, such as tapping, swiping and/or pinching. Touch sensors and/or touch screens can be used in a wide variety of electronic devices, such as smart phones and tablet computers.

Examples of touch screen technology include resistive, surface acoustic wave (SAW) and capacitive. Resistive touch screens include a thin metallic layer that is conductive and resistive, such that touching the screen results in a change in electrical current which is sent to a controller. SAW touch screens involve ultrasonic waves passing over the touch screen, and touching the screen results in absorption of part of an ultrasonic wave, which registers a position of the touch and is sent to the controller. Capacitive touch screens are coated with an electrically-charged material and touching the screen causes a change in capacitance, which allows a location to be determined which is sent to the controller.

BRIEF DESCRIPTION OF THE DRAWINGS

Features and advantages of technology embodiments will be apparent from the detailed description which follows, taken in conjunction with the accompanying drawings, which together illustrate, by way of example, technology features; and, wherein.

Figure 1:
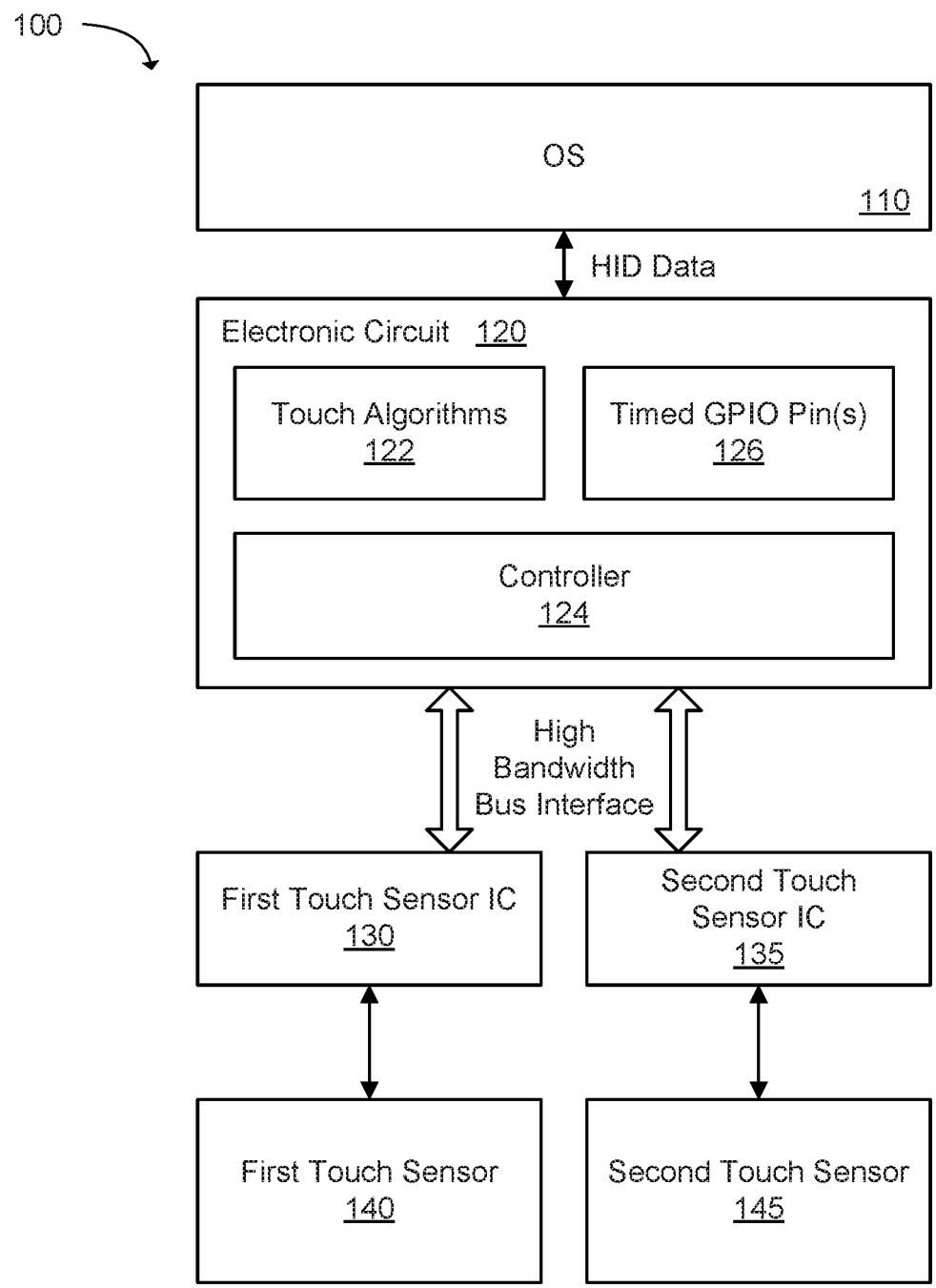
FIG. 1 illustrates a system for processing touch sensor data from multiple touch sensors in accordance with an example embodiment.

Reference will now be made to the exemplary embodiments illustrated, and specific language will be used herein to describe the same. It will nevertheless be understood that no limitation on technological scope is thereby intended.

DESCRIPTION OF EMBODIMENTS

Before the disclosed technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various invention embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "a bit line" includes a plurality of such bit lines.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "maximized," "minimized," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

The term "coupled," or "connected" as used herein and variations on their respective root words "couple" or "connect" can be used interchangeably, and are defined as directly or indirectly connected in an electrical or nonelectrical manner. "Directly coupled" or "directly connected" objects or components have a physical connection that is not shared by any other like components. For example, a touch IC that is "directly coupled" or "directly connected" to a controller or processor (e.g. on a SoC) would have an exclusive physical connection that does not include, or is otherwise shared by, any other touch IC's. In this written description, recitation of "coupled" or "connected" or variations of their respective root words, such as "coupling" or "connection" or "connecting," provides express support for "directly coupled" or "directly connected" and variations of their respective root words and vice versa. Objects described herein as being "adjacent to" each other may be in physical contact with each other, in close proximity to each other, or in the same general region or area as each other, as appropriate for the context in which the phrase is used.

Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

Touch sensors and/or touch screens can be used in a wide variety of electronic devices, such as smart phones and tablet computers. Certain two-in-one platforms, convertible platforms, detachable platforms, two-screen converged mobility platforms and/or large screen all-in-one platforms can use multiple touch integrated circuits (ICs). For example, a converged mobility system can include two touch-capable screens, and each touch IC can collect touch sensor data from each of the screens. As another example, a large screen all-in-one platform can include two or more touch ICs covering a single touch capable display, which can reduce cost by leveraging an abundance of small screen touch ICs available in the marketplace.

In these examples, it can be beneficial to jointly or collectively process touch sensor data provided by multiple touch sensors ICs on a host. By implementing time synchronization, the host can process the touch sensor data received time synchronously from the multiple touch sensor ICs as if a single touch sensor IC is being used and sending touch sensor data to the host. The multiple touch sensor ICs that send the touch sensor data to the host can be associated with multiple vendors. Thus, the host can be non-vendor specific when processing touch sensor data received from the multiple touch sensor ICs. Synchronized joint processing of touch sensor data at the host for multiple touch sensor ICs (e.g., centralized host-based processing based on a combination of multiple unmodified touch sensor ICs, as opposed to customized touch sensor ICs for a daisy chain configuration) can be useful in various scenarios. For example, joint processing of time synchronized touch sensor data can be useful for multi-touch gestures, in which a touch gesture spans across two touch sensor IC input streams (e.g., a two-finger pinch and zoom gesture with each touch sensor IC detecting one of the fingers). The joint processing of time synchronized touch sensor data can be useful for a palm rejection feature, in which one touch sensor IC senses writing with an electronic pen/stylus, while another touch sensor IC senses a user's resting palm (and touch sensor data from the resting palm can be ignored). The joint processing of time synchronized touch sensor data can be useful for a pen hover rejection feature, in which an electronic pen/stylus can be writing on a left screen (one touch sensor IC) near a center edge, but is within a hover sensing range of a right screen (another touch sensor IC). In addition, the joint processing of time synchronized touch sensor data can be useful for grip detection, in which an electronic device can be woken up when picked up based on detection of the user's grip on the electronic device. Grip detection in a folded tablet mode can be more robust when grip patterns from multiple touch screens are used together in a grip detection engine.

In the present technology, coherency can be achieved for touch/stylus sensor data across two or more touch sensor ICs using hardware-based time synchronization techniques. The time synchronization can be for a report rate and alignment between the two or more touch sensor ICs. More specifically, an electronic circuit, such as an integrated circuit, a system on a chip (SoC), a central processing unit (CPU) or a graphics processing unit (GPU), can be used to provide fine-grain time synchronization between the two or more touch sensor ICs, while keeping an independent full bandwidth direct data channel open between the touch sensor ICs and the electronic circuit. The time synchronized touch sensor data can be combined and processed as one using highly scalable host based processing in the electronic circuit, while providing reduced latency, reduced cost and reduced complexity as compared to previous solutions. In addition, by achieving the time synchronization between the two or more touch sensor ICs, users can be presented with an improved touch and writing experience on a computing platform, such as dynamically combining two screens to present as one logical virtual screen and enabling touch gestures that span across two screens. The ability to time synchronize the two or more touch sensor ICs can enable newer form factors that use two or more touch sensor ICs without adding additional components/cost.

In one previous solution, a touch sensor IC would act as a master touch sensor IC, and other touch sensor ICs would act as slave touch sensor ICs. The master touch sensor IC would be responsible for collecting all touch sensor data and presenting a cohesive view of the touch sensor data, which involved increased latency and restricted bandwidth since all touch sensor data would come through the same master touch sensor IC. The usage of the master touch sensor IC increased complexity due to an asymmetric nature of the touch sensor ICs. In another previous solution, a third touch sensor IC would be used to collect touch sensor data from two touch sensor ICs, but this previous solution also added latency and restricted bandwidth. The third touch sensor IC was used to consolidate the touch sensor data and further increased the cost of the solution. In both of the previous solutions, all of the touch sensor data would go through a single touch sensor IC, which caused the single touch sensor IC to be a bottleneck for the bandwidth and increased the latency due to this additional hop in the flow of touch sensor data between the touch sensor ICs. In other words, in both of the previous solutions, an additional integrator component or discrete integrator was used for processing of the touch sensor data.

In the present technology, rather than using a master-slave touch sensor IC architecture or a consolidator touch sensor IC, as in previous solutions, multiple touch sensor ICs can be time synchronized with each other using timed general-purpose input/output (GPIO) pins, and the multiple touch sensor ICs can each be connected to an electronic circuit. Each of the touch sensor ICs can be separately or discretely or individually coupled to the electronic circuit with no peer-to-peer communication between the touch sensor ICs. In other words, a full bandwidth direct data channel can be maintained between each touch sensor IC and the electronic circuit, while data channels between the touch sensor ICs themselves can be excluded. As discussed in further detail below, the electronic circuit with the timed GPIO pins can provide a time synchronization mechanism that enables each of the touch sensor ICs that are connected to the electronic circuit to be time synchronized with other touch sensor ICs that are connected to the electronic circuit.

FIG. 1 illustrates an exemplary system 100 (e.g., a computing system) for processing touch sensor data from multiple touch sensors, such as a first touch sensor 140 and a second touch sensor 145. The system 100 can include an electronic circuit 120. The electronic circuit 120 can be an integrated circuit, a system on a chip (SoC), a central processing unit (CPU), or a graphics processing unit (GPU). The electronic circuit 120 can include touch algorithms 122 (e.g., for detecting finger position on a touch screen). The electronic circuit 120 can include a controller 124 for receiving, combining and processing touch sensor data from the multiple touch sensors. In addition, the electronic circuit 120 can include timed general-purpose input/output (GPIO)

pins 126, which can be special pins on the electronic circuit 120 that are usable for timing purposes. The timed GPIO pins 126 can enable fine grain clock synchronization between the multiple touch sensor ICs that are connected to the multiple touch sensors. The timed GPIO pins 126 can be used to drive timing signals to achieve fine gain time synchronization and reduced latency.

In one example, the system 100 can include a first touch sensor IC 130 and a second touch sensor IC 135, which can be connected to the electronic circuit 120 via respective independent high bandwidth bus interfaces. For example, independent high bandwidth serial peripheral interface (SPI) bus channels can be formed between each touch sensor IC and the electronic circuit 120. In another example, the high bandwidth interface can be a touch serial interface (TSI) which uses a Mobile Industry Processor Interface (MIPI) physical serial communicating layer. Furthermore, the system 100 can include a first touch sensor 140 and a second touch sensor 145, which can be coupled to the first touch sensor IC 130 and the second touch sensor IC 135, respectively. In addition, the controller 124 in the electronic circuit 120 can send processed touch sensor data, which can include processed human interface device (HID) data, to an operating system (OS) 110 executing on the system 100.

As shown in FIG. 1, the system 100 can include two touch sensor ICs and two touch sensors, but this is not intended to be limiting. The system 100 can include two, three, four or more touch sensor ICs and touch sensors. In addition, the number of touch sensor ICs in the system 100 can be equal to or unequal to the number of touch sensors in the system 100.

In one example, to leverage the touch algorithms 122 (e.g., touch/stylus and gesture algorithms) that were designed for single screen devices, pre-processed touch sensor data from the first touch sensor IC 130 and the second touch sensor IC 135 can be processed together on the electronic circuit 120 (or host), and resulting processed data (e.g., a HID digitized report) can be sent to the OS 110 executing on the system 100. In order to process both touch sensor data streams together, the first touch sensor IC 130 and the second touch sensor IC 135 can be scanning and sending touch sensor data synchronously, such that the pre-processed touch sensor data can be received and combined at the electronic circuit 120. The electronic circuit 120 can have the ability to provide time synchronization capabilities for the first touch sensor IC 130 and the second touch sensor IC 135. For example, the electronic circuit 120 can implement an always running timer (ART), which can act as a time stamp counter (TSC) root. The always running timer can be implemented using the timed GPIO pins 126 on the electronic circuit 120. The timed GPIO pins 126 can enable time synchronization across a number of internal components of the electronic circuit 120. In addition, the timed GPIO pins 126 can enable the always running timer to be available to external components of the electronic circuit 120, such as the first touch sensor IC 130 and the second touch sensor IC 135.

In one example, the timed GPIO pins 126 can be in an input/output mode in relation to the electronic circuit 120. When the timed GPIO pins 126 are configured for the input mode, the first and second touch sensor ICs 130, 135 can be sending signals to the electronic circuit 120. On the other hand, when the timed GPIO pins 126 are configured for the output mode, the electronic circuit 120 can be sending signals to the first and second touch sensor ICs 130, 135. In the input mode, a timed GPIO trigger can cause an ART time to be captured in a time capture register. In the output mode, a match between an ART time and a software programmed time value can trigger a timed GPIO interrupt, and a periodic GPIO event can be generated based on a programmed interval. In addition, event counters can be managed in both the input/output modes and incremented at every trigger of the GPIO event, and a mapping of an event counter and a corresponding time capture register can be maintained and read.

In one configuration, the timed GPIO pins 126 in the electronic circuit 120 can be used to synchronize the first and second touch sensor ICs 130, 135. For example, when the timed GPIO pins 126 are configured for the input mode, the first and second touch sensor ICs 130, 135 can each send periodic pulses during an active scanning state to assigned timed GPIO pins 126 correlating to a current scan period. A value in the time capture register for each of the timed GPIO pins 126 can be used to calculate synchronization drift between the first and second touch sensor ICs 130, 135. In another example, a comparison of the time capture register can be performed every N samples using the event counter, e.g., at report #2, # N+2, #2N+2, and so on, where report #1 is a first frame in a new touch/pen contact sequence. In addition, feedback messages can be sent from the electronic circuit 120 to the first and second touch sensor ICs 130, 135 to adjust an upcoming report timing of the first and second touch sensor ICs 130, 135 when time synchronization between the two touch sensor ICs becomes misaligned.

In another example, when the timed GPIO pins 126 are configured for the output mode, a periodic pulse can be sent from the electronic circuit 120 to the first and second touch sensor ICs 130, 135. The periodic pulse can be used by the first and second touch sensor ICs 130, 135 to synchronize, which can allow both the first and second touch sensor ICs 130, 135 to subsequently send touch sensor data pulses to the electronic circuit 120 in a synchronous manner. The periodic pulse can be sent from the electronic circuit 120 when active touch or pen contact (initiated on either the first touch sensor IC 130 or the second touch sensor IC 135) is being reported.

When the timed GPIO pins 126 are configured for the input/output mode, touch sensor data pulses received at the electronic circuit 120 from the first touch sensor IC 130 can be time synchronized with touch sensor data pulses received at the electronic circuit 120 from the second touch sensor IC 135. The electronic circuit 120 can combine the touch sensor data pulses received time synchronously from the first and second touch sensor ICs 130, 135. The electronic circuit 120 can process the combined touch sensor data pulses to produce processed touch sensor data. The electronic circuit 120 can communicate the processed touch sensor data to the operation system 110. The operating system 100 can use the processed touch sensor data for an application executing on the computing system 100.

In one example, multiple timed GPIO pins 126 can be used to maintain time synchronization between the first touch sensor IC 130 and the second touch sensor IC 135. For example, the number of timed GPIO pins 126 that are used to maintain the time synchronization can correspond to the number of touch ICs that are being time synchronized. In another example, a single timed GPIO pin 126 can be shared by multiple touch sensor ICs, assuming that a drive strength of the single timed GPIO pin 126 can handle the multiple loads. In yet another example, a physical timed GPIO wire can be virtualized into ART timed messages (virtual timed GPIO) within a touch protocol implemented by the controller 124 in the electronic circuit 120.

Figure 2:
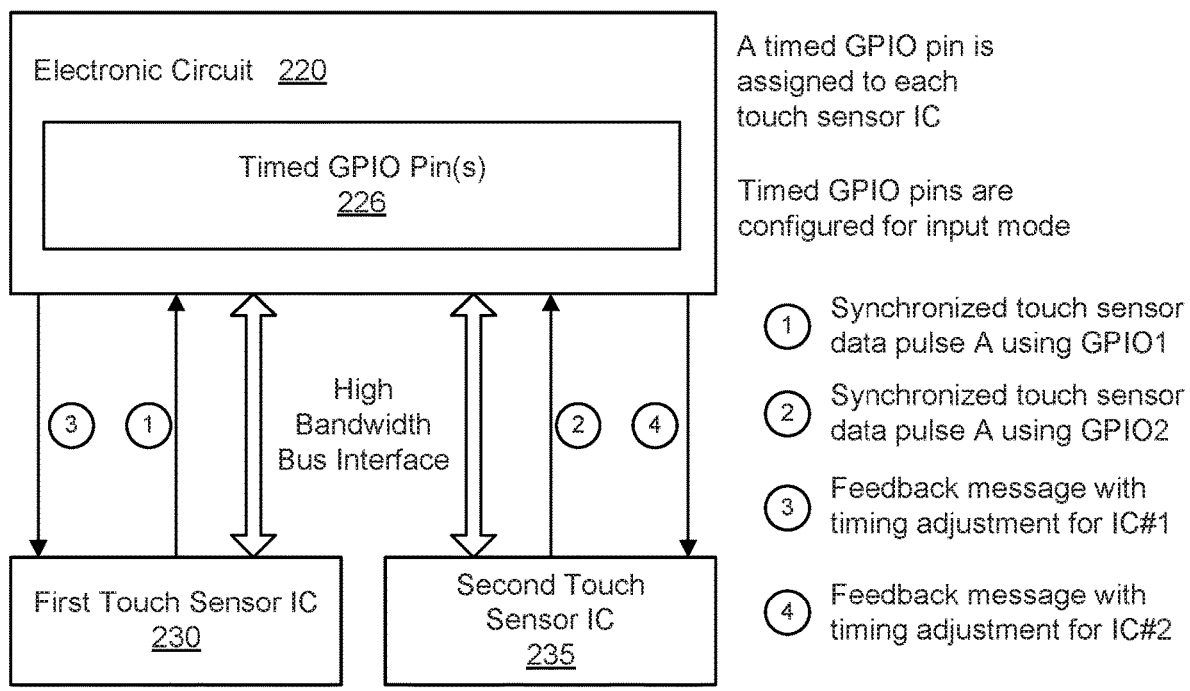
FIG. 2 illustrates time synchronization between multiple touch sensors that are connected to an electronic circuit with timed general-purpose input/output (GPIO) pins in an input mode in accordance with an example embodiment.

FIG. 2 illustrates an example of time synchronization between multiple touch sensors that are connected to an electronic circuit 220 with timed general-purpose input/output (GPIO) pins 226 in an input mode. The electronic circuit 220 can be coupled to a first touch sensor IC 230 and a second touch sensor IC 235, which can be coupled to a first touch sensor and a second touch sensor, respectively. The electronic circuit 220 can assign a timed GPIO pin 226 to each of the touch sensor ICs. For example, the electronic circuit 220 can assign GPIO1 to the first touch sensor IC 230 and GPIO2 to the second touch sensor IC 235. The assignment of a timed GPIO pin 226 to a respective touch sensor IC enables the touch sensor ICs to send touch sensor data in a synchronous manner, as the timed GPIO pins 226 can implement an always running timer (ART) that acts as a time stamp counter (TSC) root, such that the timed GPIO pins 226 can follow a common high accuracy clock. The input mode of the timed GPIO pins 226 can be relative to the electronic circuit 220 (i.e., input for the electronic circuit 220). In the input mode, the first and second touch sensor ICs 230, 235 can send synchronized touch sensor data pulses on the assigned timed GPIO pins 226. For example, the first touch sensor IC 230 can send a synchronized touch sensor data pulse A using GPIO1 to the electronic circuit 220, and the second touch sensor IC 235 can send a synchronized touch sensor data pulse B using GPIO2 to the electronic circuit 220.

In one example, the synchronized touch sensor data pulses A and B can be time stamped with a common high accuracy clock. The electronic circuit 220, via a controller, can compare the synchronized touch sensor data pulses A and B to determine whether there is a time difference (or delta) between GPIO1 and GPIO2 that exceeds a defined threshold (e.g., a time synchronization drift is more than an error tolerance rate for detecting gestures). When the time difference exceeds the defined threshold, the electronic circuit 220 can send a feedback message to each of the first and second touch sensor ICs 230, 235. The feedback message can include a timing adjustment for each of the first and second touch sensor ICs 230, 235. For example, the timing adjustment can adjust the synchronized touch sensor data pulses A and B when they are being sent to the electronic circuit 220 at an increased rate or a decreased rate (i.e., too fast or too slow) in relation to the common high accuracy clock. Based on the feedback message with the timing adjustment, the first and second touch senor ICs 230, 235 can adjust the timing of the synchronized touch sensor data pulses such that the first touch sensor IC 230 is in time synchronization with the second touch sensor IC 235.

Figure 3:
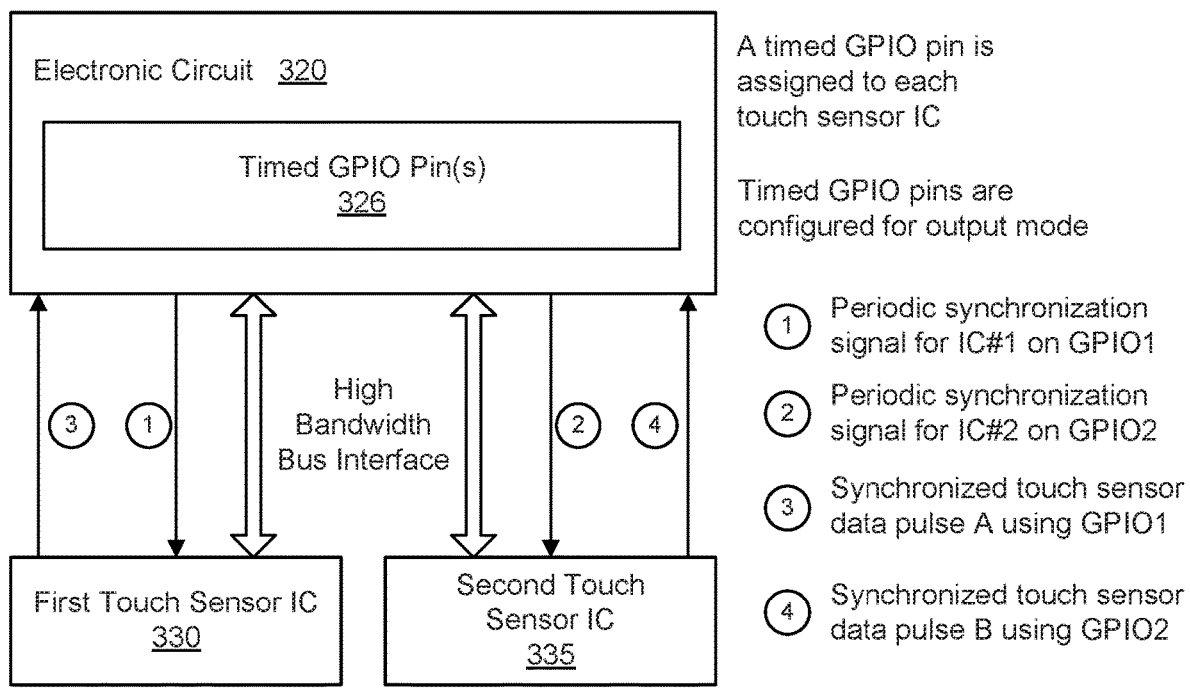
FIG. 3 illustrates time synchronization between multiple touch sensors that are connected to an electronic circuit with timed general-purpose input/output (GPIO) pins in an output mode in accordance with an example embodiment.

FIG. 3 illustrates an example of time synchronization between multiple touch sensors that are connected to an electronic circuit 320 with timed general-purpose input/output (GPIO) pins 326 in an input mode. The electronic circuit 320 can be coupled to a first touch sensor IC 330 and a second touch sensor IC 335, which can be coupled to a first touch sensor and a second touch sensor, respectively. The electronic circuit 320 can assign a timed GPIO pin 326 to each of the touch sensor ICs. For example, the electronic circuit 320 can assign GPIO1 to the first touch sensor IC 330 and GPIO2 to the second touch sensor IC 335. The output mode of the timed GPIO pins 326 can be relative to the electronic circuit 320 (i.e., output for the electronic circuit 320). In the output mode, the electronic circuit 320 can configure the timed GPIO pins 326 for output. In the output mode, the electronic circuit 320 can send a periodic synchronization signal to each of the first and second touch sensor ICs 330, 335 on their respective assigned timed GPIO pins 326. For example, the electronic circuit 330 can send a periodic synchronization signal for the first touch sensor IC 330 on GPIO1 and a periodic synchronization signal for the second touch sensor IC 335 on GPIO2. The electronic circuit 320 can send the synchronization signals periodically and synchronously for both the first and second touch sensor ICs 330, 335. The synchronization signals can be programmable to a specific scanning frequency or pulse frequency for the first and second touch sensor ICs 330, 335. In this example, the first and second touch sensor ICs 330, 335 can align their respective internal clocks and scanning cycles with the periodic synchronization signal received from the electronic circuit 320. In other words, based on the periodic synchronization signal received from the electronic circuit 320, the first and second touch sensor ICs 330, 335 can align themselves with the periodic synchronization signal, such that the first touch sensor IC 330 can be in time synchronization with the second touch sensor IC 335.

Figure 4:
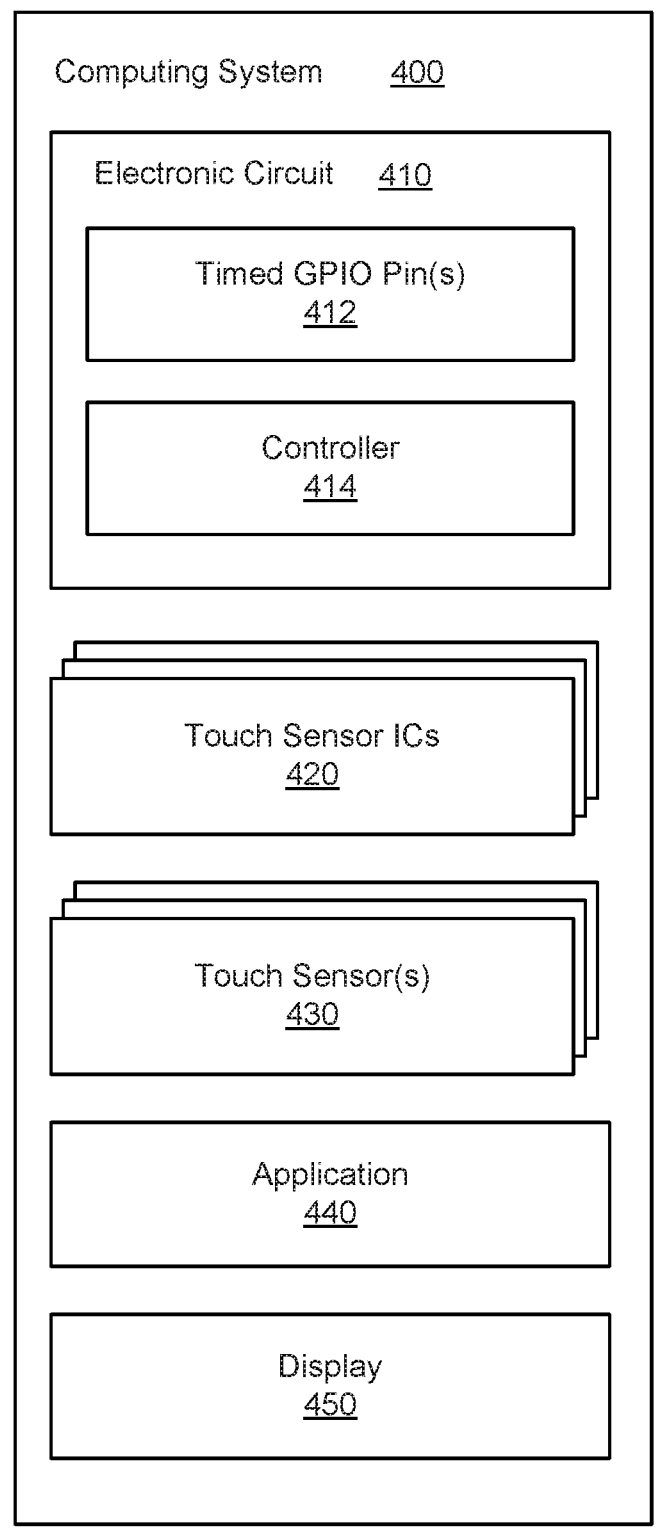
FIG. 4 illustrates a computing system in accordance with an example embodiment.
Figure 5:
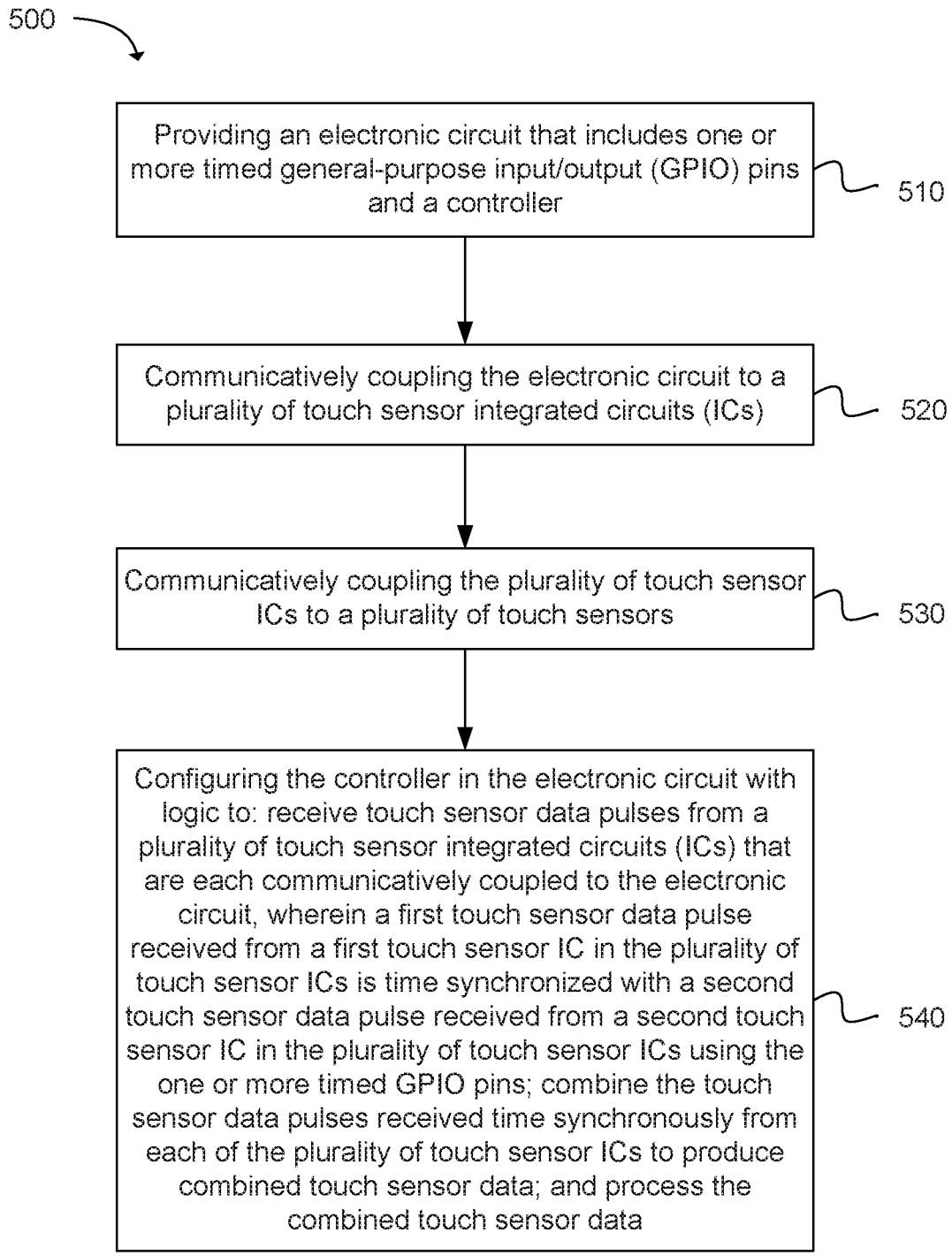
FIG. 5 is a flowchart illustrating operations for making a computing system operable to process time synchronized touch sensor data in accordance with an example embodiment.
Figure 6:
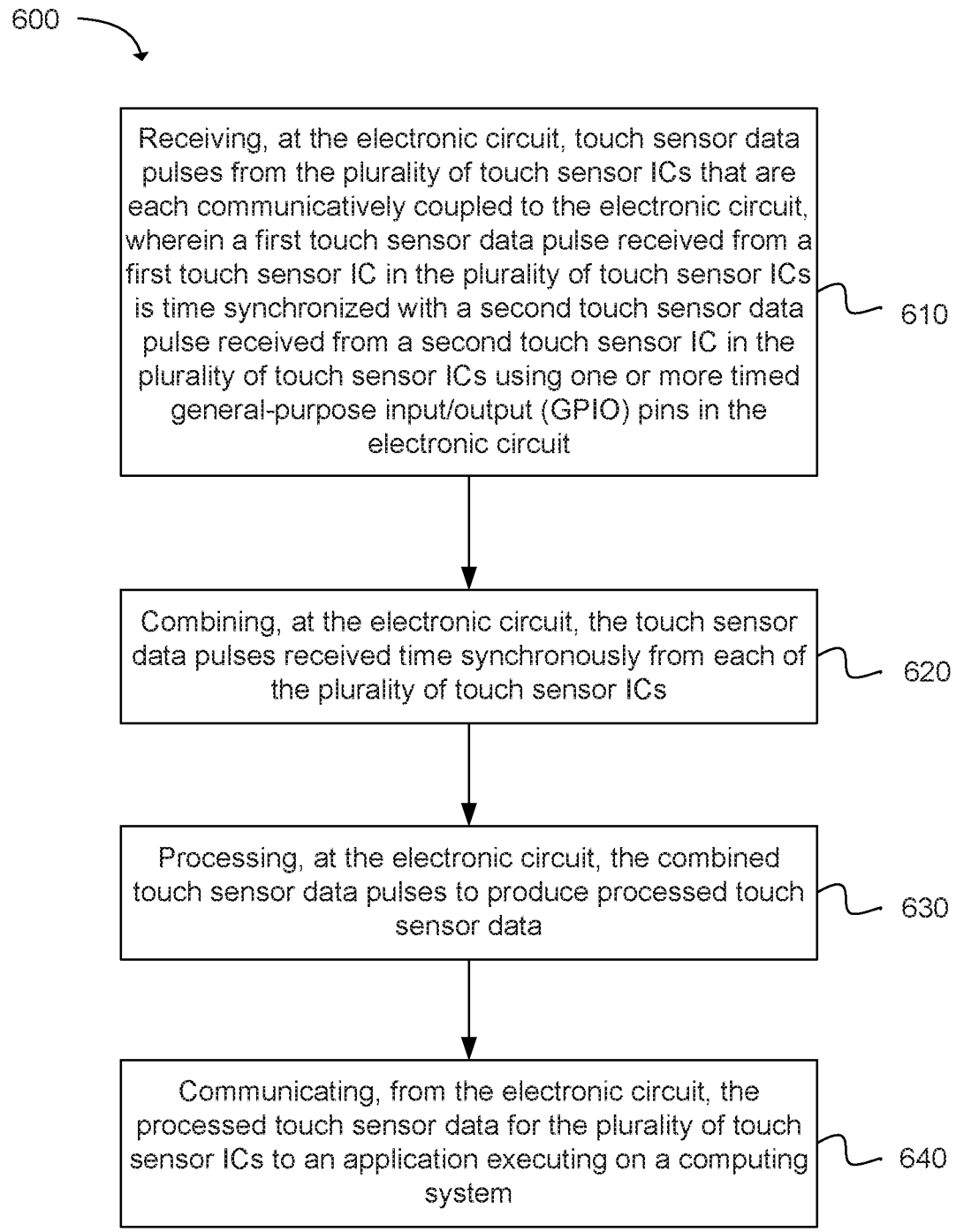
FIG. 6 is a flowchart illustrating operations for time synchronizing touch sensor data pulses from a plurality of touch sensor integrated circuits (ICs) in accordance with an example embodiment.

FIG. 4 can include a computing system 400. The computing system 400 can include an electronic circuit 410, a plurality of touch sensor integrated circuits (ICs) 420 that are communicatively coupled to the electronic circuit 410, and a plurality of touch sensors 430 that are communicatively coupled to the touch sensor ICs 420. The electronic circuit 410 can include one or more timed general-purpose input/output (GPIO) pins 412 and a controller 414. The controller 414 can receive touch sensor data pulses from the plurality of touch sensor ICs 420. A first touch sensor data pulse received from a first touch sensor IC in the plurality of touch sensor ICs 420 can be time synchronized with a second touch sensor data pulse received from a second touch sensor IC in the plurality of touch sensor ICs 420 using the one or more timed GPIO pins 412 in the electronic circuit 410. The controller 414 can combine the touch sensor data pulses received time synchronously from each of the plurality of touch sensor ICs 420. The controller 414 can process the combined touch sensor data pulses to produce processed touch sensor data. The controller 414 can communicate the processed touch sensor data for the plurality of touch sensor ICs 420 to an application 440 executing on the computing system 400. In addition, the computing system 400 can include a display 450 that displays information received from the application 440 operating on the computing system 400, where the information can be generated using the processed touch sensor data received from the controller 414.

Another example provides a method 500 for method of making a computing system operable to process time synchronized touch sensor data. The method can include the operation of: providing an electronic circuit that includes one or more timed general-purpose input/output (GPIO) pins and a controller, as in block 510. The method can include the operation of: communicatively coupling the electronic circuit to a plurality of touch sensor integrated circuits (ICs), as in block 520. The method can include the operation of: communicatively coupling the plurality of touch sensor ICs to a plurality of touch sensors, as in block 530. The method can include the operation of: configuring the controller in the electronic circuit with logic to: receive touch sensor data pulses from a plurality of touch sensor integrated circuits (ICs) that are each communicatively coupled to the electronic circuit, wherein a first touch sensor data pulse received from a first touch sensor IC in the plurality of touch sensor ICs is time synchronized with a second touch sensor data pulse received from a second touch sensor IC in the plurality of touch sensor ICs using the one or more timed GPIO pins; combine the touch sensor data pulses received time synchronously from each of the plurality of touch sensor ICs to produce combined touch sensor data; and process the combined touch sensor data, as in block 540.

Another example provides a method 600 for time synchronizing touch sensor data pulses from a plurality of touch sensor integrated circuits (ICs). The method can be executed as instructions on a machine, where the instructions are included on at least one computer readable medium or one non-transitory machine readable storage medium. The method can include the operation of: receiving, at the electronic circuit, touch sensor data pulses from the plurality of touch sensor ICs that are each communicatively coupled to the electronic circuit, wherein a first touch sensor data pulse received from a first touch sensor IC in the plurality of touch sensor ICs is time synchronized with a second touch sensor data pulse received from a second touch sensor IC in the plurality of touch sensor ICs using one or more timed general-purpose input/output (GPIO) pins in the electronic circuit, as in block 610. The method can include the operation of: combining, at the electronic circuit, the touch sensor data pulses received time synchronously from each of the plurality of touch sensor ICs, as in block 620. The method can include the operation of: processing, at the electronic circuit, the combined touch sensor data pulses to produce processed touch sensor data, as in block 630. The method can include the operation of: communicating, from the electronic circuit, the processed touch sensor data for the plurality of touch sensor ICs to an application executing on a computing system, as in block 640.

Figure 7:
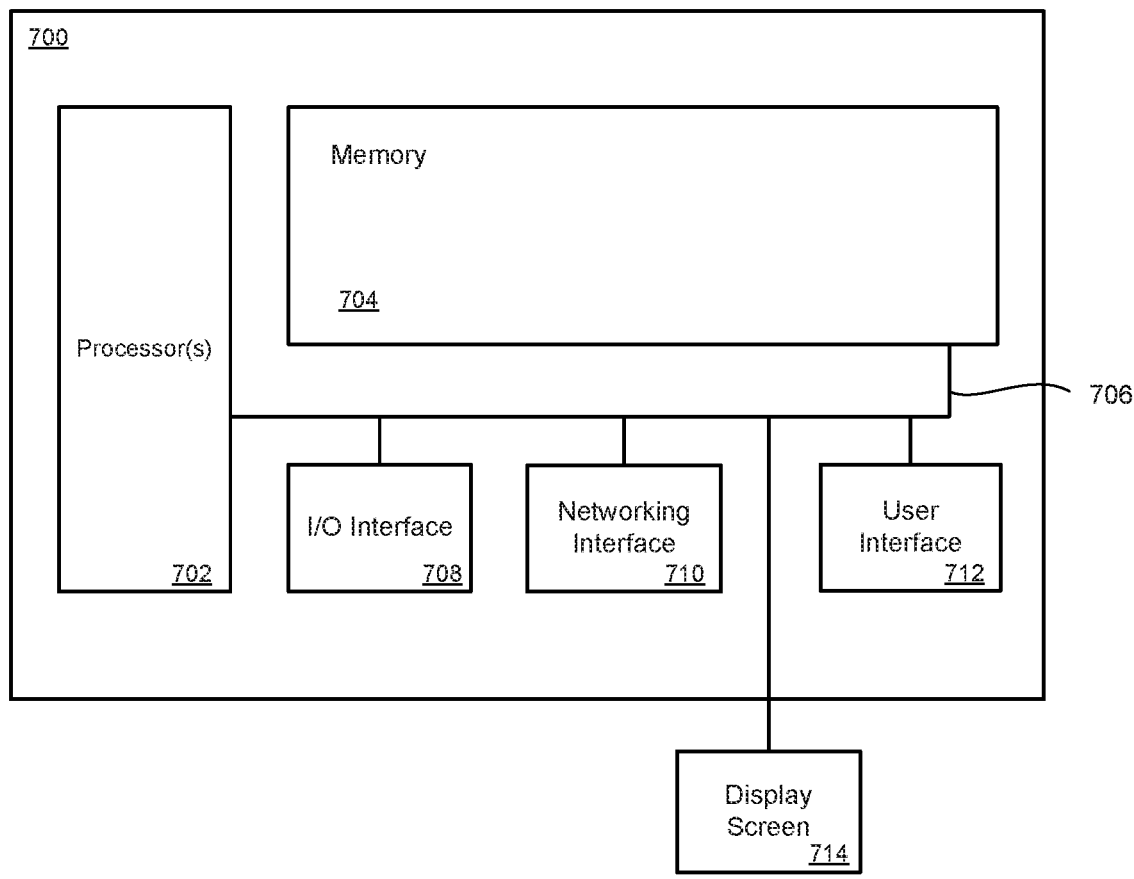
FIG. 7 illustrates a computing system that includes a data storage device in accordance with an example embodiment.

FIG. 7 illustrates a general computing device 700 that can be employed in the present technology. The computing device 700 can include a processor 702 in communication with a memory 704. The memory 704 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing device 700 additionally includes a local communication interface 706 for connectivity between the various components of the system. For example, the local communication interface 706 can be a local data bus and/or any related address or control busses as may be desired.

The computing device 700 can also include an I/O (input/output) interface 708 for controlling the I/O functions of the system, as well as for I/O connectivity to devices outside of the computing device 700. A network interface 710 can also be included for network connectivity. The network interface 710 can control network communications both within the system and outside of the system. The network interface can include a wired interface, a wireless interface, a Bluetooth interface, optical interface, and the like, including appropriate combinations thereof. Furthermore, the computing device 700 can additionally include a user interface 712, a display device 714, as well as various other components that would be beneficial for such a system.

The processor 702 can be a single or multiple processors, and the memory 704 can be a single or multiple memories. The local communication interface 706 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific invention embodiments and point out specific features, elements, or steps that can be used or otherwise combined in achieving such embodiments.

In one example, there is provided an electronic circuit, comprising: one or more timed general-purpose input/output (GPIO) pins; and a controller operable to: receive touch sensor data pulses from a plurality of touch sensor integrated circuits (ICs) that are each separately coupled to the electronic circuit with no peer-to-peer communication between the plurality of touch sensor ICs, wherein a first touch sensor data pulse received from a first touch sensor IC in the plurality of touch sensor ICs is time synchronized with a second touch sensor data pulse received from a second touch sensor IC in the plurality of touch sensor ICs using the one or more timed GPIO pins; combine the touch sensor data pulses received time synchronously from each of the plurality of touch sensor ICs to produce joint touch sensor data; and perform joint processing of the joint touch sensor data at the controller of the electronic circuit.

In one example of the electronic circuit, the one or more timed GPIO pins enable an always running timer (ART) on the electronic circuit to be available to the plurality of touch sensor ICs, wherein the ART acts as a time stamp counter (TSC) root for the plurality of touch sensor ICs.

In one example of the electronic circuit, the controller is further operable to: assign the one or more timed GPIO pins to the first touch sensor IC and the second touch sensor IC; and receive the first touch sensor data pulse from the first touch sensor IC and the second touch sensor data pulse from the second touch sensor IC, respectively, as input data pulses using the assigned one or more timed GPIO pins when the assigned timed GPIO pins are configured to operate in an input mode in relation to the electronic circuit, wherein the assigned one or more timed GPIOs function to time synchronize the first touch sensor data pulse with the second touch sensor data pulse.

In one example of the electronic circuit, the controller is further operable to: determine that a time synchronization drift between the first touch sensor IC and the second touch sensor IC exceeds a defined threshold based on a value in a time capture register for each timed GPIO pin; and send a feedback message to one or more of the first touch sensor IC or the second touch sensor IC to adjust a timing to achieve time synchronization alignment between the first touch sensor IC and the second touch sensor IC.

In one example of the electronic circuit, the controller is further operable to receive the first touch sensor data pulse and the second touch sensor data pulse during an active scanning state of the first touch sensor IC and the second touch sensor IC, respectively.

In one example of the electronic circuit, the controller is further operable to send a synchronization signal to each of the first touch sensor IC and the second touch sensor IC using the one or more timed GPIO pins when the timed GPIO pins are configured to operate in an output mode in relation to the electronic circuit, wherein the first touch sensor IC and the second touch sensor IC are configured to align with the synchronization signal to achieve time synchronization between the first touch sensor IC and the second touch sensor IC.

In one example of the electronic circuit, the plurality of touch sensor ICs are communicatively coupled to the electronic circuit via an open full bandwidth direct data channel between the plurality of touch sensor ICs and the electronic circuit.

In one example of the electronic circuit, a data channel is excluded between the plurality of touch sensor ICs.

In one example of the electronic circuit, the electronic circuit is one of: an integrated circuit, a system on a chip (SoC), a central processing unit (CPU), or a graphics processing unit (GPU).

In one example of the electronic circuit, the controller is further operable to communicate processed touch sensor data for the plurality of touch sensor ICs to an application executing in a computing system.

In one example, there is provided a computing system, comprising: an electronic circuit, comprising: one or more timed general-purpose input/output (GPIO) pins; and a controller; a plurality of touch sensor integrated circuits (ICs) that are each separately coupled to the electronic circuit with no peer-to-peer communication between the plurality of touch sensor ICs; and a plurality of touch sensors that are communicatively coupled to the touch sensor ICs, wherein the controller in the electronic circuit is operable to: receive touch sensor data pulses from the plurality of touch sensor ICs, wherein a first touch sensor data pulse received from a first touch sensor IC in the plurality of touch sensor ICs is time synchronized with a second touch sensor data pulse received from a second touch sensor IC in the plurality of touch sensor ICs using the one or more timed GPIO pins in the electronic circuit; combine the touch sensor data pulses received time synchronously from each of the plurality of touch sensor ICs; process the combined touch sensor data pulses to produce processed touch sensor data; and communicate the processed touch sensor data for the plurality of touch sensor ICs to an application executing on the computing system.

In one example of the computing system, the computing system further comprises a display operable to display information received from the application executing on the computing system, wherein the information is generated using the processed touch sensor data received from the controller in the electronic circuit.

In one example of the computing system, the one or more timed GPIO pins in the electronic circuit enable an always running timer (ART) on the electronic circuit to be available to the plurality of touch sensor ICs, wherein the ART acts as a time stamp counter (TSC) root for the plurality of touch sensor ICs.

In one example of the computing system, the controller in the electronic circuit is further operable to: assign the one or more timed GPIO pins to the first touch sensor IC and the second touch sensor IC; and receive the first touch sensor data pulse from the first touch sensor IC and the second touch sensor data pulse from the second touch sensor IC, respectively, as input data pulses using the assigned one or more timed GPIO pins when the assigned timed GPIO pins are configured to operate in an input mode in relation to the electronic circuit, wherein the assigned one or more timed GPIOs function to time synchronize the first touch sensor data pulse with the second touch sensor data pulse.

In one example of the computing system, the controller in the electronic circuit is further operable to: determine that a time synchronization drift between the first touch sensor IC and the second touch sensor IC exceeds a defined threshold based on a value in a time capture register for each timed GPIO pin; and send a feedback message to one or more of the first touch sensor IC or the second touch sensor IC to adjust a timing to achieve time synchronization alignment between the first touch sensor IC and the second touch sensor IC.

In one example of the computing system, the controller in the electronic circuit is further operable to receive the first touch sensor data pulse and the second touch sensor data pulse during an active scanning state of the first touch sensor IC and the second touch sensor IC, respectively.

In one example of the computing system, the controller in the electronic circuit is further operable to send a synchronization signal to each of the first touch sensor IC and the second touch sensor IC using the one or more timed GPIO pins when the timed GPIO pins are configured to operate in an output mode in relation to the electronic circuit, wherein the first touch sensor IC and the second touch sensor IC are configured to align with the synchronization signal to achieve time synchronization between the first touch sensor IC and the second touch sensor IC.

In one example of the computing system, the plurality of touch sensor ICs are communicatively coupled to the electronic circuit via an open full bandwidth direct data channel between the plurality of touch sensor ICs and the electronic circuit.

In one example of the computing system, a data channel is excluded between the plurality of touch sensor ICs.

In one example of the computing system, the electronic circuit is one of: an integrated circuit, a system on a chip (SoC), a central processing unit (CPU), or a graphics processing unit (GPU).

In one example there is provided a method of making a computing system operable to process time synchronized touch sensor data, the method comprising: providing an electronic circuit that includes one or more timed general-purpose input/output (GPIO) pins and a controller; communicatively coupling the electronic circuit to a plurality of touch sensor integrated circuits (ICs)), wherein each of the plurality of touch sensor ICs are separately coupled to the electronic circuit with no peer-to-peer communication between the plurality of touch sensor ICs; communicatively coupling the plurality of touch sensor ICs to a plurality of touch sensors; configuring the controller in the electronic circuit with logic to: receive touch sensor data pulses from a plurality of touch sensor integrated circuits (ICs) that are each communicatively coupled to the electronic circuit, wherein a first touch sensor data pulse received from a first touch sensor IC in the plurality of touch sensor ICs is time synchronized with a second touch sensor data pulse received from a second touch sensor IC in the plurality of touch sensor ICs using the one or more timed GPIO pins; combine the touch sensor data pulses received time synchronously from each of the plurality of touch sensor ICs to produce joint touch sensor data; and perform joint processing of the joint touch sensor data.

In one example of the method of making the computing system operable to process time synchronized touch sensor data, the one or more timed GPIO pins enable an always running timer (ART) on the electronic circuit to be available to the plurality of touch sensor ICs, wherein the ART acts as a time stamp counter (TSC) root for the plurality of touch sensor ICs.

In one example of the method of making the computing system operable to process time synchronized touch sensor data, the method further comprises configuring an open full bandwidth direct data channel between the electronic circuit and the plurality of touch sensor ICs.

In one example of the method of making the computing system operable to process time synchronized touch sensor data, the method further comprises excluding a data channel between the plurality of touch sensor ICs.

In one example of the method of making the computing system operable to process time synchronized touch sensor data, the electronic circuit is one of: an integrated circuit, a system on a chip (SoC), a central processing unit (CPU), or a graphics processing unit (GPU).

In one example there is provided at least one non-transitory machine readable storage medium having instructions embodied thereon for time synchronizing touch sensor data pulses from a plurality of touch sensor integrated circuits (ICs), the instructions when executed by an electronic circuit perform the following: receiving, at the electronic circuit, touch sensor data pulses from the plurality of touch sensor ICs that are each separately coupled to the electronic circuit with no peer-to-peer communication between the plurality of touch sensor ICs, wherein a first touch sensor data pulse received from a first touch sensor IC in the plurality of touch sensor ICs is time synchronized with a second touch sensor data pulse received from a second touch sensor IC in the plurality of touch sensor ICs using one or more timed general-purpose input/output (GPIO) pins in the electronic circuit; combining, at the electronic circuit, the touch sensor data pulses received time synchronously from each of the plurality of touch sensor ICs; processing, at the electronic circuit, the combined touch sensor data pulses to produce processed touch sensor data; and communicating, from the electronic circuit, the processed touch sensor data for the plurality of touch sensor ICs to an application executing on a computing system.

In one example of the at least one non-transitory machine readable storage medium, the at least one non-transitory machine readable storage medium further comprises instructions when executed perform the following: assigning the one or more timed GPIO pins to the first touch sensor IC and the second touch sensor IC; and receiving the first touch sensor data pulse from the first touch sensor IC and the second touch sensor data pulse from the second touch sensor IC, respectively, as input data pulses using the assigned one or more timed GPIO pins when the assigned timed GPIO pins are configured to operate in an input mode in relation to the electronic circuit, wherein the assigned one or more timed GPIOs function to time synchronize the first touch sensor data pulse with the second touch sensor data pulse.

In one example of the at least one non-transitory machine readable storage medium, the at least one non-transitory machine readable storage medium further comprises instructions when executed perform the following: determining that a time synchronization drift between the first touch sensor IC and the second touch sensor IC exceeds a defined threshold based on a value in a time capture register for each timed GPIO pin; and sending a feedback message to one or more of the first touch sensor IC or the second touch sensor IC to adjust a timing to achieve time synchronization alignment between the first touch sensor IC and the second touch sensor IC.

In one example of the at least one non-transitory machine readable storage medium, the at least one non-transitory machine readable storage medium further comprises instructions when executed perform the following: receiving the first touch sensor data pulse and the second touch sensor data pulse during an active scanning state of the first touch sensor IC and the second touch sensor IC, respectively.

In one example of the at least one non-transitory machine readable storage medium, the at least one non-transitory machine readable storage medium further comprises instructions when executed perform the following: sending a synchronization signal to each of the first touch sensor IC and the second touch sensor IC using the one or more timed GPIO pins when the timed GPIO pins are configured to operate in an output mode in relation to the electronic circuit, wherein the first touch sensor IC and the second touch sensor IC are configured to align with the synchronization signal to achieve time synchronization between the first touch sensor IC and the second touch sensor IC.

While the foregoing examples are illustrative of the principles of invention embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. An electronic circuit, comprising:
one or more timed general-purpose input/output (GPIO) pins; and
a controller operable to:
assign the one or more timed GPIO pins to a first touch sensor integrated circuit (IC) and a second touch sensor IC each separately coupled to the electronic circuit with no peer-to-peer communication between; the first and second touch sensor ICs;
receive a first touch sensor data pulse from the first touch sensor IC and a second touch sensor data pulse from the second touch sensor IC, respectively, as input data pulses using the assigned one or more timed GPIO pins when the assigned timed GPIO pins are configured to operate in an input mode in relation to the electronic circuit, wherein the assigned one or more timed GPIOs function to time synchronize the first touch sensor data pulse with the second touch sensor data pulse;

determine that a time synchronization drift between the first touch sensor IC and the second touch sensor IC exceeds a defined threshold based on a value in a time capture register for each timed GPIO pin;

send a feedback message to one or more of the first touch sensor IC or the second touch sensor IC to adjust a timing to achieve time synchronization alignment between the first touch sensor IC and the second touch sensor IC;

combine the touch sensor data pulses received time synchronously from each of the plurality of touch sensor ICs to produce joint touch sensor data; and perform joint processing of the joint touch sensor data at the controller of the electronic circuit.

2. The electronic circuit of claim 1, wherein the one or more timed GPIO pins enable an always running timer (ART) on the electronic circuit to be available to the plurality of touch sensor ICs, wherein the ART acts as a time stamp counter (TSC) root for the plurality of touch sensor ICs.

3. The electronic circuit of claim 1, wherein the controller is further operable to receive the first touch sensor data pulse and the second touch sensor data pulse during an active scanning state of the first touch sensor IC and the second touch sensor IC, respectively.

4. The electronic circuit of claim 1, wherein the controller is further operable to send a synchronization signal to each of the first touch sensor IC and the second touch sensor IC using the one or more timed GPIO pins when the timed GPIO pins are configured to operate in an output mode in relation to the electronic circuit, wherein the first touch sensor IC and the second touch sensor IC are configured to align with the synchronization signal to achieve time synchronization between the first touch sensor IC and the second touch sensor IC.

5. The electronic circuit of claim 1, wherein the plurality of touch sensor ICs are communicatively coupled to the electronic circuit via an open full bandwidth direct data channel between the plurality of touch sensor ICs and the electronic circuit.

6. The electronic circuit of claim 1, wherein a data channel is excluded between the plurality of touch sensor ICs.

7. The electronic circuit of claim 1, wherein the electronic circuit is one of: an integrated circuit, a system on a chip (SoC), a central processing unit (CPU), or a graphics processing unit (GPU).

8. The electronic circuit of claim 1, wherein the controller is further operable to communicate processed touch sensor data for the plurality of touch sensor ICs to an application executing in a computing system.

9. A computing system, comprising:
an electronic circuit, comprising:
one or more timed general-purpose input/output (GPIO) pins; and
a controller;
a plurality of touch sensor integrated circuits (ICs) that are each separately coupled to the electronic circuit with no peer-to-peer communication between the plurality of touch sensor ICs; and
a plurality of touch sensors that are communicatively coupled to the touch sensor ICs,
wherein the controller in the electronic circuit is operable to:

assign the one or more timed GPIO pins to a first touch sensor IC and a second touch sensor IC;

receive a first touch sensor data pulse from the first touch sensor IC and a second touch sensor data pulse from the second touch sensor IC, respectively, as input data pulses using the assigned one or more timed GPIO pins when the assigned timed GPIO pins are configured to operate in an input mode in relation to the electronic circuit, wherein the assigned one or more timed GPIOs function to time synchronize the first touch sensor data pulse with the second touch sensor data pulse;

determine that a time synchronization drift between the first touch sensor IC and the second touch sensor IC exceeds a defined threshold based on a value in a time capture register for each timed GPIO pin; and send a feedback message to one or more of the first touch sensor IC or the second touch sensor IC to adjust a timing to achieve time synchronization alignment between the first touch sensor IC and the second touch sensor;

combine the touch sensor data pulses received time synchronously from each of the plurality of touch sensor ICs;

process the combined touch sensor data pulses to produce processed touch sensor data; and communicate the processed touch sensor data for the plurality of touch sensor ICs to an application executing on the computing system.

10. The computing system of claim 9, further comprising a display operable to display information received from the application executing on the computing system, wherein the information is generated using the processed touch sensor data received from the controller in the electronic circuit.

11. The computing system of claim 9, wherein the one or more timed GPIO pins in the electronic circuit enable an always running timer (ART) on the electronic circuit to be available to the plurality of touch sensor ICs, wherein the ART acts as a time stamp counter (TSC) root for the plurality of touch sensor ICs.

12. The computing system of claim 9, wherein the controller in the electronic circuit is further operable to receive the first touch sensor data pulse and the second touch sensor data pulse during an active scanning state of the first touch sensor IC and the second touch sensor IC, respectively.

13. The computing system of claim 9, wherein the controller in the electronic circuit is further operable to send a synchronization signal to each of the first touch sensor IC and the second touch sensor IC using the one or more timed GPIO pins when the timed GPIO pins are configured to operate in an output mode in relation to the electronic circuit, wherein the first touch sensor IC and the second touch sensor IC are configured to align with the synchronization signal to achieve time synchronization between the first touch sensor IC and the second touch sensor IC.

14. The computing system of claim 9, wherein the plurality of touch sensor ICs are communicatively coupled to the electronic circuit via an open full bandwidth direct data channel between the plurality of touch sensor ICs and the electronic circuit.

15. The computing system of claim 9, wherein a data channel is excluded between the plurality of touch sensor ICs.

16. The computing system of claim 9, wherein the electronic circuit is one of: an integrated circuit, a system on a chip (SoC), a central processing unit (CPU), or a graphics processing unit (GPU).

17. A method of making a computing system operable to process time synchronized touch sensor data, the method comprising:
- providing an electronic circuit that includes one or more timed general-purpose input/output (GPIO) pins and a controller;
- communicatively coupling the electronic circuit to a plurality of touch sensor integrated circuits (ICs), wherein each of the plurality of touch sensor ICs are separately coupled to the electronic circuit with no peer-to-peer communication between the plurality of touch sensor ICs;
- communicatively coupling the plurality of touch sensor ICs to a plurality of touch sensors;
- configuring the controller in the electronic circuit with logic to:
  - assign the one or more timed GPIO pins to a first touch sensor IC and a second touch sensor IC;
  - receive a first touch sensor data pulse from the first touch sensor IC and a second touch sensor data pulse from the second touch sensor IC, respectively, as input data pulses using the assigned one or more timed GPIO pins when the assigned timed GPIO pins are configured to operate in an input mode in relation to the electronic circuit, wherein the assigned one or more timed GPIOs function to time synchronize the first touch sensor data pulse with the second touch sensor data pulse;
  - determine that a time synchronization drift between the first touch sensor IC and the second touch sensor IC exceeds a defined threshold based on a value in a time capture register for each timed GPIO pin; and
  - send a feedback message to one or more of the first touch sensor IC or the second touch sensor IC to adjust a timing to achieve time synchronization alignment between the first touch sensor IC and the second touch sensor;
  - combine the touch sensor data pulses received time synchronously from each of the plurality of touch sensor ICs to produce joint touch sensor data; and
  - perform joint processing of the joint touch sensor data.

18. The method of claim 17, wherein the one or more timed GPIO pins enable an always running timer (ART) on the electronic circuit to be available to the plurality of touch sensor ICs, wherein the ART acts as a time stamp counter (TSC) root for the plurality of touch sensor ICs.

19. The method of claim 17, further comprising configuring an open full bandwidth direct data channel between the electronic circuit and the plurality of touch sensor ICs.

20. The method of claim 17, further comprising excluding a data channel between the plurality of touch sensor ICs.

21. The method of claim 17, wherein the electronic circuit is one of: an integrated circuit, a system on a chip (SoC), a central processing unit (CPU), or a graphics processing unit (GPU).

22. At least one non-transitory machine readable storage medium having instructions embodied thereon for time synchronizing touch sensor data pulses from a plurality of touch sensor integrated circuits (ICs), each separately coupled to an electronic circuit using one or more timed general purpose input/output pins (GPIO) with no peer-to-peer communication between the plurality of touch sensor ICs, the instructions when executed by the electronic circuit perform the following:
- assigning the one or more timed GPIO pins to a first touch sensor IC and a second touch sensor IC;
- receiving a first touch sensor data pulse from the first touch sensor IC and a second touch sensor data pulse from the second touch sensor IC, respectively, as input data pulses using the assigned one or more timed GPIO pins when the assigned timed GPIO pins are configured to operate in an input mode in relation to the electronic circuit, wherein the assigned one or more timed GPIOs function to time synchronize the first touch sensor data pulse with the second touch sensor data pulse;
- determining that a time synchronization drift between the first touch sensor IC and the second touch sensor IC exceeds a defined threshold based on a value in a time capture register for each timed GPIO pin;
- sending a feedback message to one or more of the first touch sensor IC or the second touch sensor IC to adjust a timing to achieve time synchronization alignment between the first touch sensor IC and the second touch sensor;
- combining, at the electronic circuit, the touch sensor data pulses received time synchronously from each of the plurality of touch sensor ICs;
- processing, at the electronic circuit, the combined touch sensor data pulses to produce processed touch sensor data; and
- communicating, from the electronic circuit, the processed touch sensor data for the plurality of touch sensor ICs to an application executing on a computing system.

23. The at least one non-transitory machine readable storage medium of claim 22, further comprising instructions when executed perform the following: receiving the first touch sensor data pulse and the second touch sensor data pulse during an active scanning state of the first touch sensor IC and the second touch sensor IC, respectively.

24. The at least one non-transitory machine readable storage medium of claim 22, further comprising instructions when executed perform the following: sending a synchronization signal to each of the first touch sensor IC and the second touch sensor IC using the one or more timed GPIO pins when the timed GPIO pins are configured to operate in an output mode in relation to the electronic circuit, wherein the first touch sensor IC and the second touch sensor IC are configured to align with the synchronization signal to achieve time synchronization between the first touch sensor IC and the second touch sensor IC.

\* \* \* \* \*